United States Patent
Kim et al.

(10) Patent No.: US 12,423,023 B2
(45) Date of Patent: Sep. 23, 2025

(54) MEMORY CONTROLLER FOR MANAGING JOURNAL DATA, AND OPERATING METHOD OF THE MEMORY CONTROLLER

(71) Applicant: SAMSUNG ELECTRONICS CO., LTD., Suwon-si (KR)

(72) Inventors: Chanha Kim, Suwon-si (KR); Namwook Kang, Suwon-si (KR); Youngjo Park, Suwon-si (KR); Kwangmin Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 13 days.

(21) Appl. No.: 18/388,684

(22) Filed: Nov. 10, 2023

(65) Prior Publication Data
US 2024/0184483 A1    Jun. 6, 2024

(30) Foreign Application Priority Data
Dec. 5, 2022 (KR) .......... 10-2022-0168097

(51) Int. Cl.
*G06F 3/06* (2006.01)

(52) U.S. Cl.
CPC .......... *G06F 3/0656* (2013.01); *G06F 3/0604* (2013.01); *G06F 3/0644* (2013.01); *G06F 3/0679* (2013.01)

(58) Field of Classification Search
CPC .... G06F 3/0656; G06F 3/0604; G06F 3/0644; G06F 3/0679
See application file for complete search history.

(56) References Cited

U.S. PATENT DOCUMENTS

| | | | |
|---|---|---|---|
| 10,191,663 B1* | 1/2019 | O'Neill | G06F 3/0604 |
| 10,997,065 B2 | 5/2021 | Ha et al. | |
| 11,132,140 B1 | 9/2021 | Benjamin et al. | |
| 11,269,771 B2 | 3/2022 | Kim et al. | |
| 11,301,369 B2 | 4/2022 | Gholamipour et al. | |
| 11,392,505 B2 | 7/2022 | Wei | |
| 2008/0046443 A1* | 2/2008 | Fachan | G06F 12/0866 |
| 2013/0117286 A1* | 5/2013 | Gallant | G06F 3/0614 707/752 |
| 2014/0236892 A1* | 8/2014 | Blyler | G06F 11/1451 707/625 |
| 2015/0134875 A1* | 5/2015 | Veal | G06F 3/064 711/102 |

(Continued)

FOREIGN PATENT DOCUMENTS

KR    10-1548452 B1    8/2015

*Primary Examiner* — Edward J Dudek, Jr.
(74) *Attorney, Agent, or Firm* — Sughrue Mion, PLLC

(57) ABSTRACT

A storage device includes a journal buffer configured to store a plurality of pieces of journal data, the journal buffer including a plurality of bank pools and a journal data region, where each of the plurality of pieces of journal data includes a first data item corresponding to a bank address and a second data item corresponding to a row address and a memory controller configured to control the journal buffer to temporarily store first pieces of journal data from among the plurality of pieces of journal data of which the first data items are equal to each other in at least one of the plurality of bank pools and rearrange the first pieces of journal data based on results of a comparison between the second data items corresponding to the first pieces of journal data.

20 Claims, 15 Drawing Sheets

(56) References Cited

U.S. PATENT DOCUMENTS

| | | | |
|---|---|---|---|
| 2015/0193464 A1* | 7/2015 | Kwon | G06F 16/1815 |
| | | | 707/648 |
| 2015/0207874 A1* | 7/2015 | Crockett | H04L 41/0896 |
| | | | 707/614 |
| 2016/0314163 A1* | 10/2016 | Marquardt | G06F 16/13 |
| 2019/0042146 A1* | 2/2019 | Wysoczanski | G06F 12/0846 |
| 2020/0218619 A1 | 7/2020 | Hwang et al. | |
| 2022/0083515 A1 | 3/2022 | Yoon et al. | |
| 2022/0206713 A1 | 6/2022 | Kim et al. | |
| 2024/0028465 A1* | 1/2024 | Murray | G06F 11/1435 |

* cited by examiner

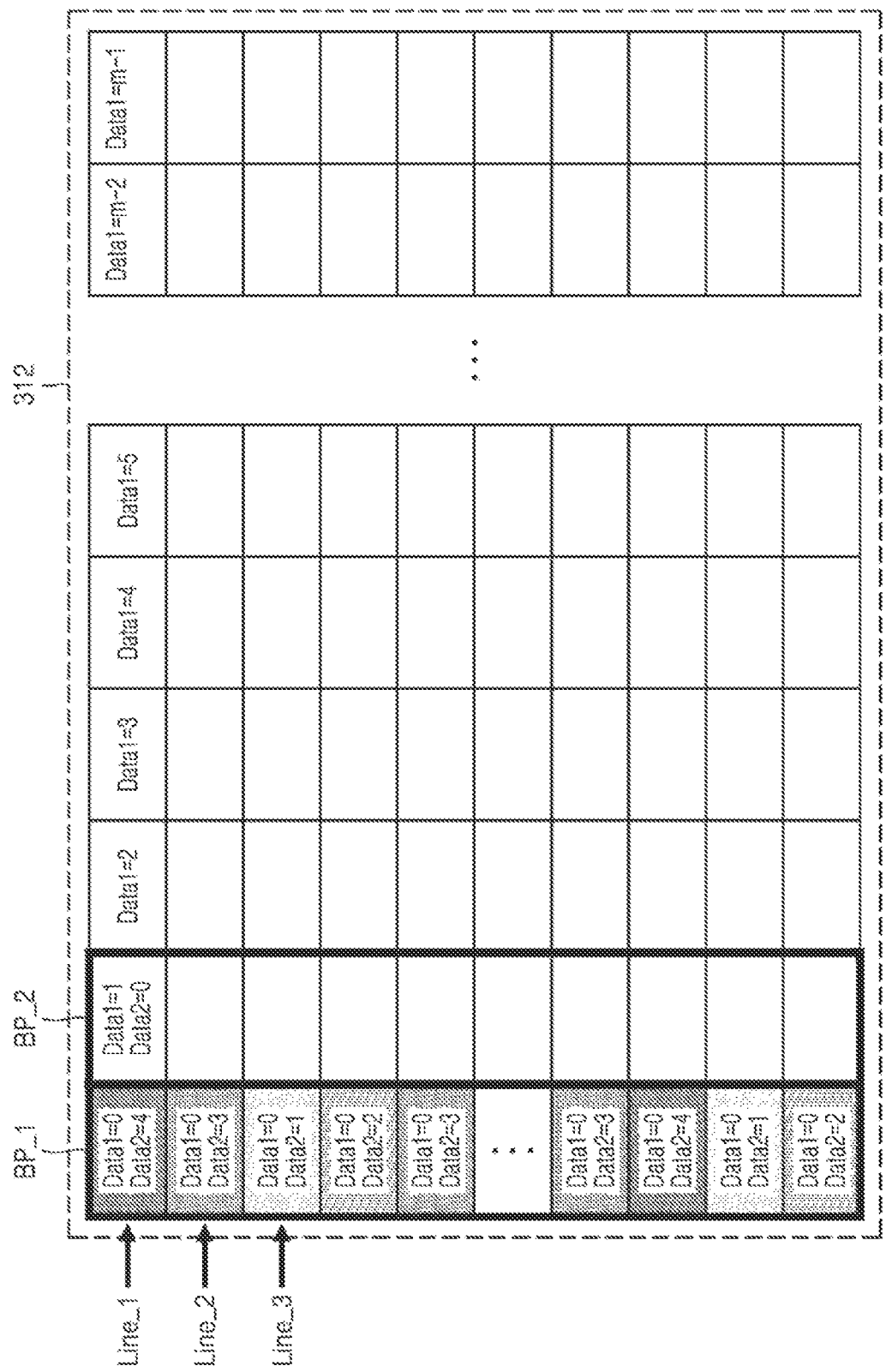

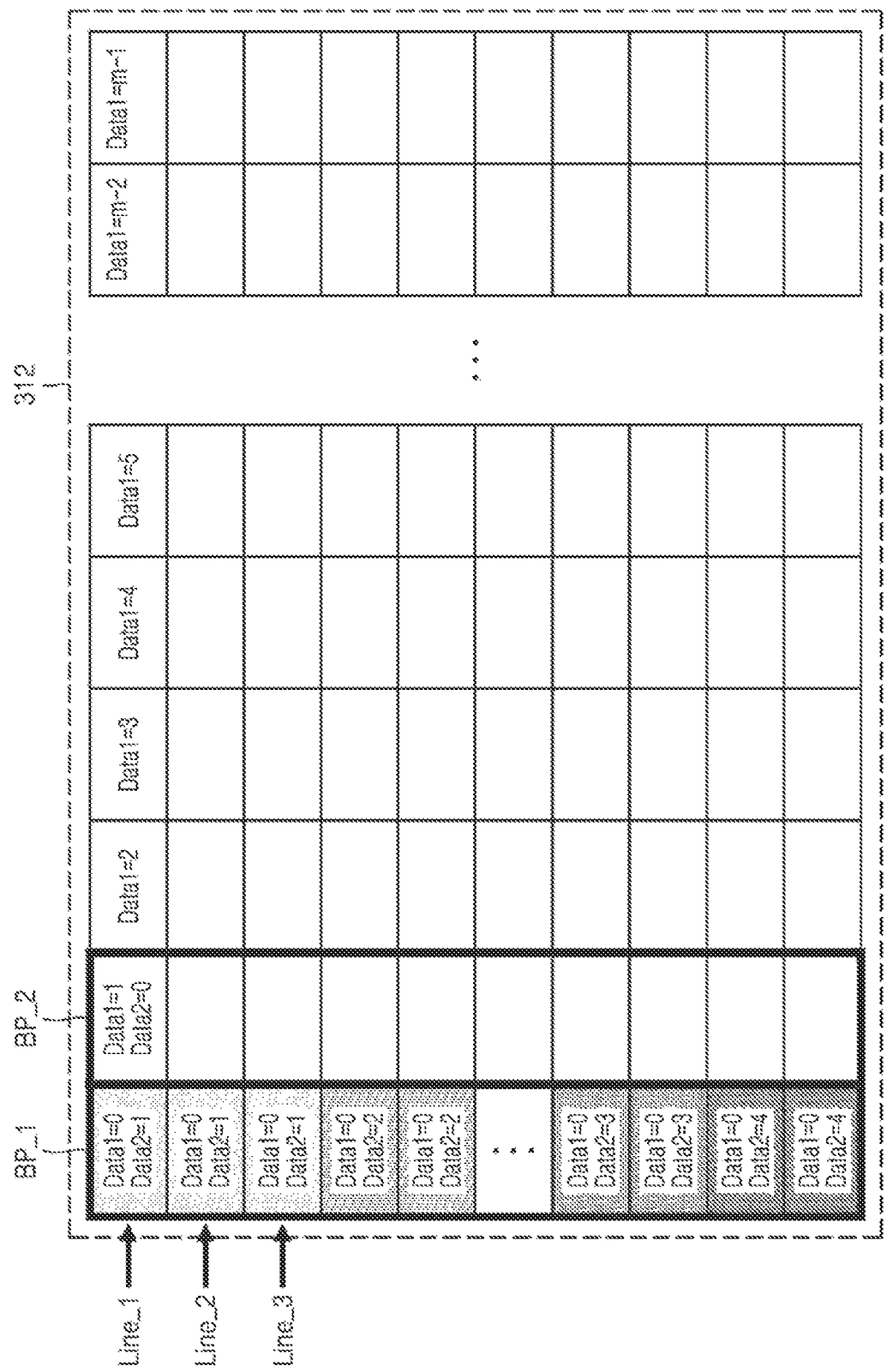

FIG. 8

| | BP_1 | BP_2 | BP_3 | BP_4 | BP_5 |
|---|---|---|---|---|---|
| | Data1=0 Data2=0 | Data1=1 Data2=0 | Data1=2 Data2=0 | Data1=3 Data2=1 | Data1=4 Data2=1 |
| | Data1=0 Data2=1 | Data1=1 Data2=0 | Data1=2 Data2=0 | Data1=3 Data2=1 | Data1=4 Data2=1 |
| | Data1=0 Data2=1 | Data1=1 Data2=2 | Data1=2 Data2=2 | Data1=3 Data2=1 | Data1=4 Data2=2 |
| | Data1=0 Data2=2 | Data1=1 Data2=2 | Data1=2 Data2=2 | Data1=3 Data2=2 | Data1=4 Data2=2 |
| | Data1=0 Data2=2 | Data1=1 Data2=2 | Data1=2 Data2=2 | Data1=3 Data2=2 | Data1=4 Data2=2 |
| | ⋮ | ⋮ | ⋮ | ⋮ | ⋮ |
| | Data1=0 Data2=3 | Data1=1 Data2=3 | Data1=2 Data2=2 | Data1=3 Data2=3 | Data1=4 Data2=3 |
| | Data1=0 Data2=3 | Data1=1 Data2=4 | Data1=2 Data2=3 | Data1=3 Data2=3 | Data1=4 Data2=4 |
| | Data1=0 Data2=4 | Data1=1 Data2=4 | Data1=2 Data2=3 | Data1=3 Data2=4 | Data1=4 Data2=4 |
| | Data1=0 Data2=4 | Data1=1 Data2=4 | Data1=2 Data2=4 | Data1=3 Data2=4 | Data1=4 Data2=4 |
| Journal data Data1=0 Data2=5 | Data1=0 Data2=4 | X | O | Data1=3 Data2=4 | X |

FIG. 13B

MEMORY CONTROLLER FOR MANAGING JOURNAL DATA, AND OPERATING METHOD OF THE MEMORY CONTROLLER

CROSS-REFERENCE TO RELATED APPLICATION

This application is based on and claims priority to Korean Patent Application No. 10-2022-0168097, filed on Dec. 5, 2022, in the Korean Intellectual Property Office, the disclosure of which is incorporated herein by reference in its entirety.

BACKGROUND

1. Field

Example embodiments of the disclosure relate to an electronic device, and more particularly, to a storage device including a memory controller, an operating method of the memory controller, and a journal data management method.

2. Description of Related Art

Electronic devices, such as smartphones, tablets, and computers, may store a variety of data to provide various experiences to users. To use the data, electronic devices may include storage devices configured to store data and that are under control by a host. Such a storage device may include a memory device configured to store data and a memory controller configured to control the memory device. Memory devices may be classified into a volatile type and a non-volatile type.

When an unexpected situation occurs, such as an unexpected power-off situation, a kernel panic, or an application crash, during the operation of an electronic device, some data (e.g., metadata) stored in a storage device of the electronic device may be damaged. Electronic devices may generate journal data in preparation for such a situation. Therefore, there is a need to reduce the open time of a storage device by efficiently managing journal data when an electronic device reboots.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

Provided are a storage device, an operating method of a memory controller, and a journal data management method, capable of reducing the open time of electronic devices during rebooting.

Additional aspects will be set forth in part in the description which follows and, in part, will be apparent from the description, or may be learned by practice of the presented embodiments.

According to an aspect of an example embodiment, a storage device may include a journal buffer configured to store a plurality of pieces of journal data, the journal buffer including a plurality of bank pools and a journal data region, where each of the plurality of pieces of journal data may include a first data item corresponding to a bank address and a second data item corresponding to a row address and a memory controller configured to control the journal buffer to temporarily store first pieces of journal data from among the plurality of pieces of journal data of which the first data items are equal to each other in at least one of the plurality of bank pools and rearrange the first pieces of journal data based on results of a comparison between the second data items corresponding to the first pieces of journal data.

According to an aspect of an example embodiment, an operating method of a memory controller configured to control operations of a journal buffer comprising a plurality of bank pools and a journal data region may include generating a plurality of pieces of journal data each including a first data item and a second data item, temporarily storing, in at least one of the plurality of bank pools, first pieces of journal data from among the plurality of pieces of journal data of which the first data items are equal to each other, and rearranging an order of the first pieces of journal data temporarily stored in the at least one of the plurality of bank pools such that pieces of journal data among the first pieces of journal data of which the second data items are equal to each other are adjacent to each other, where the first data items may correspond to bank addresses in a volatile memory device and where the second data items may correspond to row addresses in the volatile memory device.

According to an aspect of an example embodiment, a journal data management method of managing an order of K pieces of journal data, each K piece of journal data including a first data item and a second data item, may include arranging the K pieces of journal data in ascending order or descending order based on a result of comparison of the first data items and the second data items of the K pieces of journal data, selecting one of the K pieces of journal data arranged in ascending order or descending order as an nth piece of journal data, selecting, among unselected pieces of journal data following the nth piece of journal data and as an (n+1)th piece of journal data, a piece of journal data having an earliest order and of which the first data item is different from the first data item of the nth piece of journal data, and selecting, based on the first data items of the unselected pieces of journal data following the nth piece of journal data being equal to the first data item of the nth piece of journal data, and as the (n+1)th piece of journal data, a piece of journal data having an earliest order among the unselected pieces of journal data, where K may be an integer greater than or equal to 3, n may be an integer greater than or equal to 1 and less than K, the first data items may correspond to bank addresses and the second data items may correspond to row addresses.

BRIEF DESCRIPTION OF DRAWINGS

The above and other aspects, features, and advantages of certain example embodiments of the present disclosure will be more apparent from the following description taken in conjunction with the accompanying drawings, in which:

FIG. 6 is a diagram illustrating journal data stored in bank pools according to an embodiment;

FIG. 7 is a diagram illustrating journal data stored in bank pools according to an embodiment;

FIG. 8 is a diagram illustrating journal data stored in bank pools according to an embodiment;

FIGS. 13A and 13B are diagrams illustrating journal data before and after the journal data is managed according to the flowchart of the journal data management method shown in FIG. 12, according to an embodiment.

DETAILED DESCRIPTION

Figure 1:
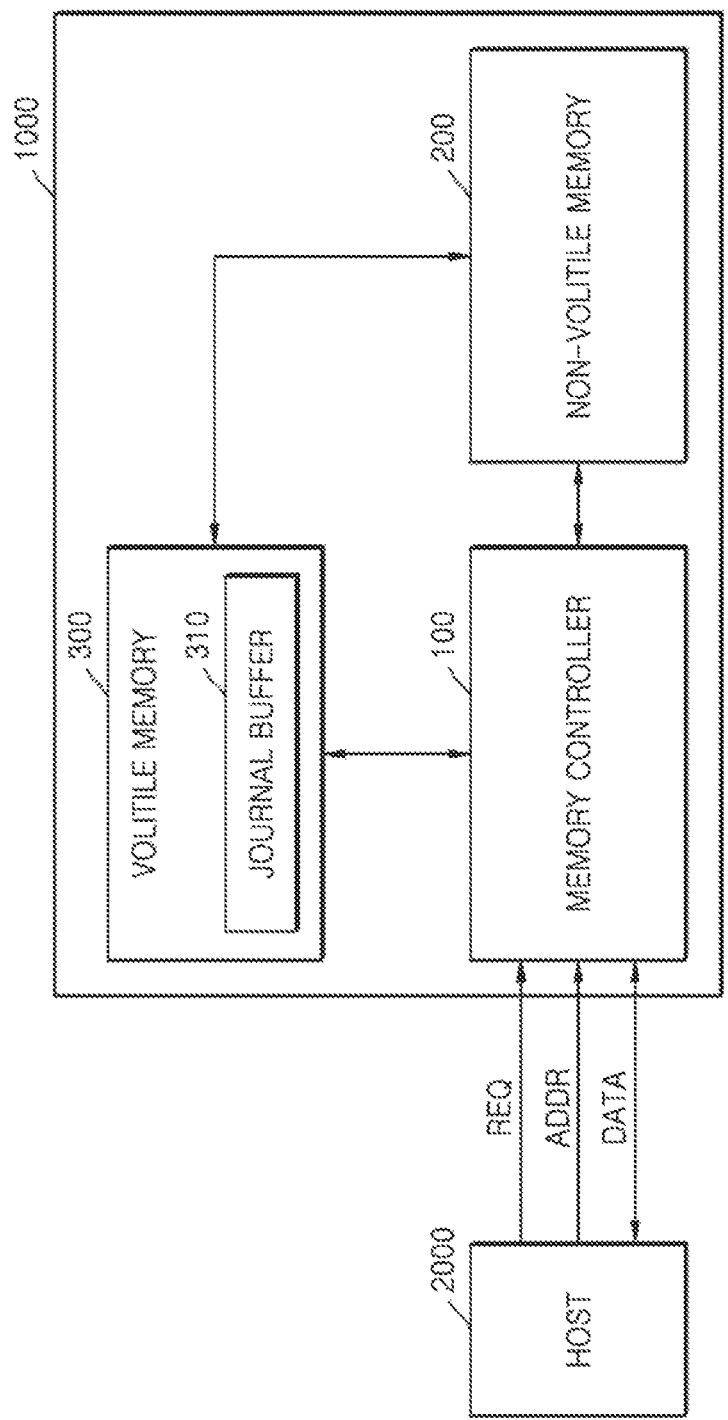
FIG. 1 is a diagram illustrating a storage system according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a diagram illustrating a storage system according to an embodiment.

Referring to FIG. 1, the storage system may include a storage device 1000 and a host 2000.

The storage device 1000 may store data according to a request from the host 2000. The storage device 1000 may include a memory controller 100, a non-volatile memory device 200, and a volatile memory device 300.

The host 2000 may transmit a data operation request REQ and an address ADDR to the memory controller 100, and may exchange data DATA with the memory controller 100. For example, the host 2000 may exchange data DATA with the memory controller 100 based on at least one of various interface protocols, such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a mobile industry processor interface (MIPI) protocol, a universal flash storage (UFS) protocol, and a compute express link (CXL) protocol.

The memory controller 100 may execute a command in response to a request received by the storage device 1000. For example, the memory controller 100 may control the storage device 1000 in response to a data operation request REQ received from the host 2000 to read data DATA stored in the non-volatile memory device 200 or the volatile memory device 300 of the storage device 1000 or write data DATA into the non-volatile memory device 200 or the volatile memory device 300 of the storage device 1000. For this read or write operation, data DATA may be transmitted between the memory controller 100 and the non-volatile memory device 200 or the volatile memory device 300.

The time required for applying external power to the storage device 1000 and turning on the storage device 1000 may be referred to as an open time. Most of the open time may be used for writing journal data stored in the non-volatile memory device 200 to the volatile memory device 300. An operation of writing journal data stored in the non-volatile memory device 200 to the volatile memory device 300 may be referred to as journal replay. According to an embodiment, the open time of the storage device 1000 may be reduced by controlling the memory controller 100 to efficiently manage journal data and thus reduce the time required for journal replay.

The memory controller 100 may transmit, to the non-volatile memory device 200, commands, addresses, and data that are generated by the memory controller 100 regardless of a request from the host 2000. For example, the memory controller 100 may generate commands, addresses, and data for performing a background operation. In addition, the memory controller 100 may provide the commands, addresses, and data to the volatile memory device 300 and/or the non-volatile memory device 200. For example, the background operation may include data rebuilding, garbage collection, or the like. For example, the garbage collection may be an operation of copying valid data of memory blocks to free blocks and erasing invalid data.

When write data is provided to the non-volatile memory device 200, the memory controller 100 may update metadata in response to the write data. The memory controller 100 may control the volatile memory device 300 to store updated metadata. The memory controller 100 may write updated metadata stored in the volatile memory device 300 to the non-volatile memory device 200. The metadata may be data for managing user data. For example, the metadata may include at least one piece of information selected from among logical-physical address mapping information, valid page information, reliability information, and a variety of information for managing the memory space of the volatile memory device 300 or the non-volatile memory device 200. When the storage device 1000 is booted by power supplied to the storage device 1000, the memory controller 100 may provide metadata stored in the non-volatile memory device 200 to the volatile memory device 300.

When the operation of the storage device 1000 is abnormally terminated, updated metadata stored in the volatile memory device 300 may not be written into the non-volatile memory device 200. The memory controller 100 may generate journal data containing information on updates of metadata, and the journal data may be data containing information corresponding to changes in user data and/or metadata. For example, the journal data may include information on the type of an operation in which metadata is changed, and practical data for restoring changes in metadata. For example, the journal data may include at least one piece of information selected from the group consisting of bank addresses, row addresses, a physical page number (PPN), a logical page number, valid page information, and reliability information of the volatile memory device 300. The memory controller 100 may store the journal data in the non-volatile memory device 200. When the storage device 1000 reboots, metadata of the volatile memory device 300 may be updated using the journal data stored in the non-volatile memory device 200. In other words, when the memory controller 100 is powered on after the storage device 1000 is powered off, the memory controller 100 may provide metadata and journal data stored in the non-volatile memory device 200 to the volatile memory device 300. The memory controller 100 may restore or update metadata using journal data. The power-off situation may refer to a sudden power-off situation in which power supplied to the storage device 1000 is cut off in a state in which the storage device 1000 does not receive a power-off command.

To write journal data, provided for the volatile memory device 300, to the volatile memory device 300, the memory controller 100 may enable a bank and a row according to a bank address and a row address of the volatile memory device 300 that are included in the journal data.

In an embodiment, to optimize access to the volatile memory device 300 when updating metadata of the volatile memory device 300 using journal data stored in the non-volatile memory device 200, the memory controller 100 may manage the journal data (e.g., by arranging the journal data in a specific order) by considering characteristics of the volatile memory device 300 before the storage device 1000 is powered off. For example, each piece of journal data may include a first data item Data1 indicating a bank address of the volatile memory device 300 and a second data item Data2 indicating a row address of the volatile memory device 300. The memory controller 100 may manage a plurality of pieces of journal data based on the first data items Data1 (bank addresses) and/or the second data items Data2 (row addresses).

According to various embodiments, the non-volatile memory device 200 may include NAND flash memory, vertical NAND (VNAND) flash memory, NOR flash memory, or a combination thereof.

According to various embodiments, the volatile memory device 300 may include resistive random access memory (RRAM), phase-change random access memory (PRAM), magnetoresistive random access memory (MRAM), ferroelectric random access memory (FRAM), spin transfer torque random access memory (STT-RAM), or a combination thereof.

The volatile memory device 300 may include a journal buffer 310. Journal data may be stored in the journal buffer 310, and in a specific condition, the memory controller 100 may provide the journal data stored in the journal buffer 310 to the non-volatile memory device 200. For example, the specific condition may refer to the maximum number of pieces of journal data storable in the journal buffer 310, and when the maximum amount of pieces of journal data is stored in the journal buffer 310, the memory controller 100 may provide the journal data stored in the journal buffer 310 to the non-volatile memory device 200. In the disclosure, however, the specific condition is not limited thereto. As described above, journal data may be managed in a specific order based on first data items Data1 (bank addresses) and/or second data items Data2 (row addresses) of the journal data, and the memory controller 100 may store the journal data in the journal buffer 310 according to the specific order and may provide the journal data to the non-volatile memory device 200 while maintaining the specific order. The journal buffer 310 is further described with reference to FIG. 2.

Figure 2:
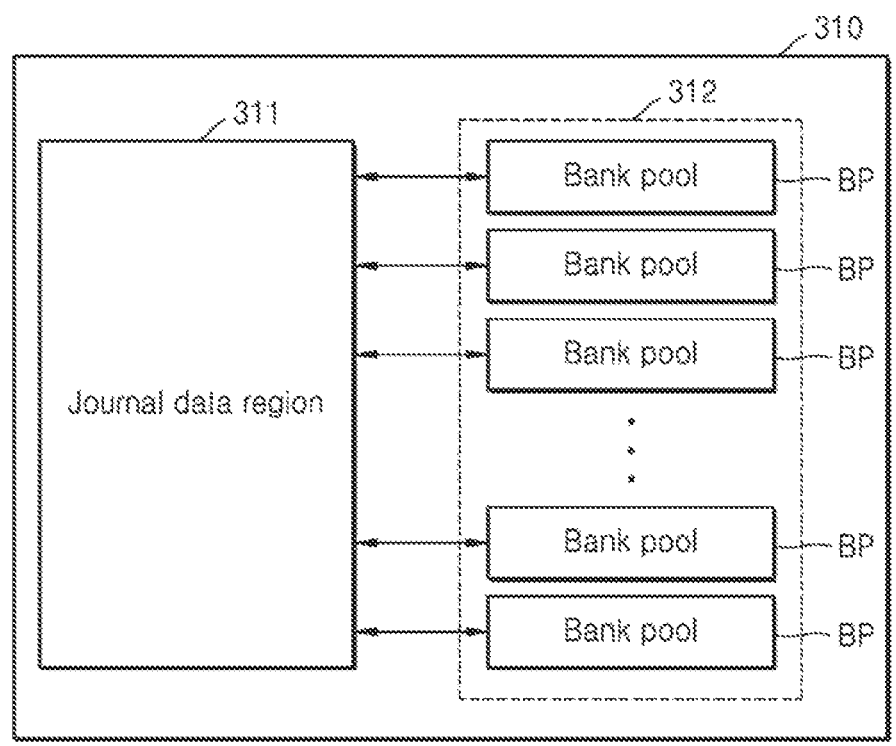
FIG. 2 is a diagram illustrating a journal buffer according to an embodiment.

FIG. 2 is a diagram illustrating a journal buffer according to an embodiment.

Referring to FIG. 2, the journal buffer 310 may include a journal data region 311 and a bank pool group 312. The bank pool group 312 may include a plurality of bank pools BP.

The bank pools BP may refer to regions of a remaining storage space of the journal buffer 310 except for the journal data region 311. Each piece of journal data may be temporarily stored in at least one of the bank pools BP of the bank pool group 312 and then stored in the journal data region 311. The expression "temporarily stored" may indicate the case of storing journal data in the bank pools BP for managing the journal data before storing the journal data in the journal data region 311 of the journal buffer 310.

Pieces of journal data may be temporarily stored in at least one of the bank pools BP based on the first data items Data1 of the pieces of journal data. For example, journal data including a first data item Data1 indicating an address of a first bank 320_1 (refer to FIG. 3) of the volatile memory device 300 may be temporarily stored in a first bank pool BP_1 (refer to FIG. 5), and journal data including a first data item Data1 indicating an address of a second bank 320_2 (refer to FIG. 3) of the volatile memory device 300 may be temporarily stored in a second bank pool BP_2 (refer to FIG. 5).

Each of the bank pools BP may correspond to a bank of the volatile memory device 300, and pieces of journal data temporarily stored in the bank pools BP may be provided to corresponding banks of the volatile memory device 300. For example, the first bank pool BP_1 (refer to FIG. 5) may correspond to the first bank 320_1 (refer to FIG. 3) of the volatile memory device 300, and the second bank pool BP_2 (refer to FIG. 5) may correspond to the second bank 320_2 of the volatile memory device 300. Therefore, pieces of journal data temporarily stored in the first bank pool BP_1 may be provided to the first bank 320_1, and pieces of journal data temporarily stored in the second bank pool BP_2 may be provided to the second bank 320_2. In other words, journal data including a first data item Data1 indicating the address of the first bank 320_1 of the volatile memory device 300 may be temporarily stored in the first bank pool BP_1, and may be provided to the first bank 320_1.

Figure 3:
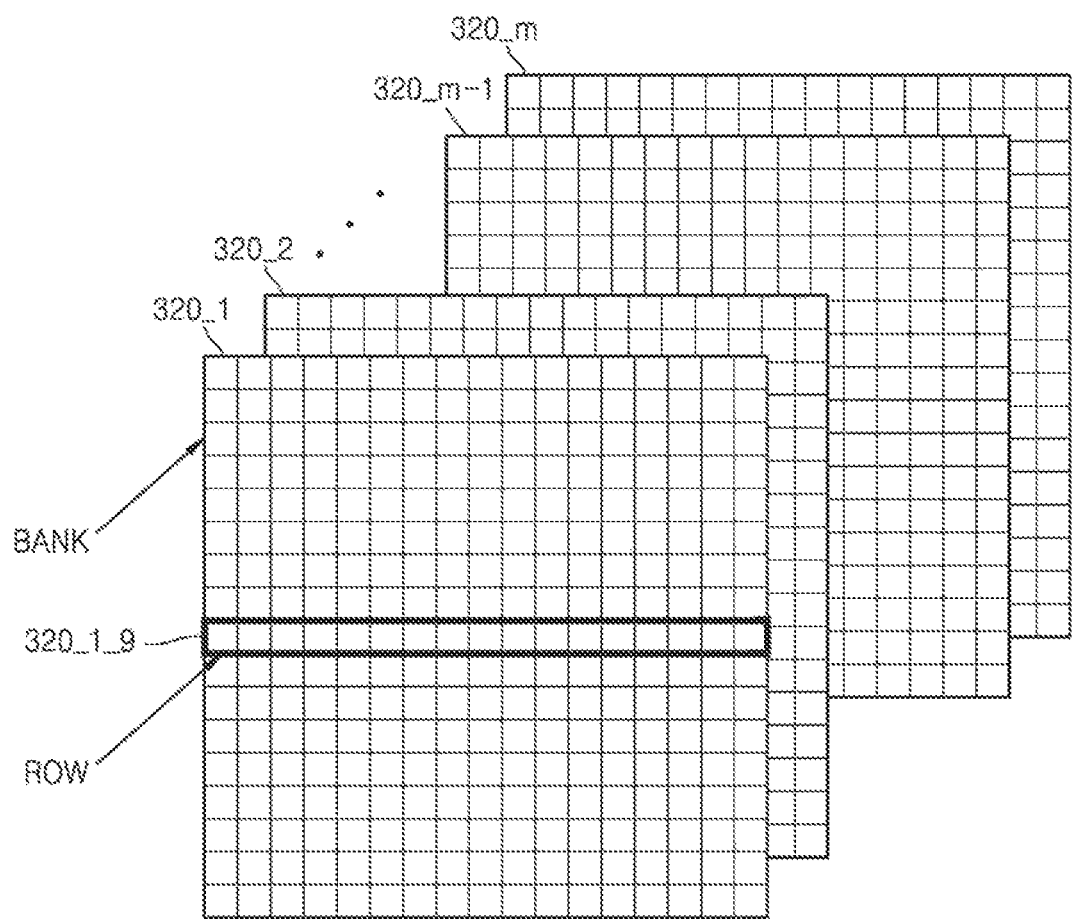
FIG. 3 is a diagram illustrating banks and rows of a volatile memory device according to an embodiment.

FIG. 3 is a diagram illustrating banks and rows of a volatile memory device according to an embodiment.

The volatile memory device 300 may include a plurality of banks 320_1 to 320_*m*. The bank may refer to a memory cell array. Referring to FIG. 3, each of the plurality of banks 320_1 to 320_*m* may include a plurality of rows.

When power is applied to the storage device 1000 from the outside and journal data stored in the non-volatile memory device 200 is provided to the volatile memory device 300, the journal data may be stored in the volatile memory device 300 according to the first data items Data1 and the second data items Data2 included in the journal data. For example, when the first data item Data1 of a piece of journal data is 1 and the second data item Data2 of the piece of journal data is 9, the journal data may be provided to a ninth row 320_1_9 of the first bank 320_1 of the volatile memory device 300.

In FIG. 3, each of the memory cell arrays 320_1 to 320_*m* is referred to as a bank for ease of understanding, but embodiments are not limited thereto. In embodiments, the number and size of banks and rows may be defined differently.

Figure 4:
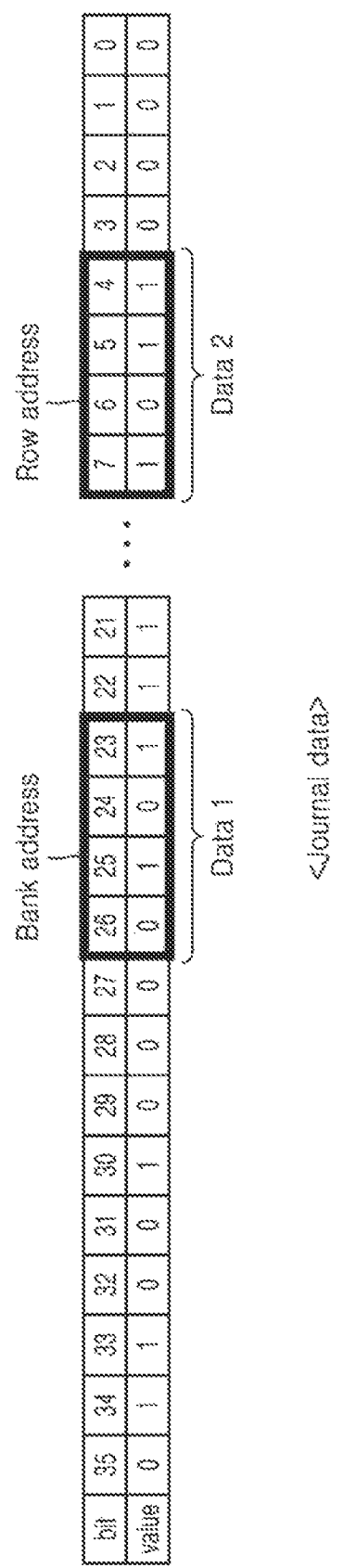
FIG. 4 is a diagram illustrating a piece of journal data including a bank address and a row address according to an embodiment.

FIG. 4 is a diagram illustrating a piece of journal data including a bank address and a row address according to an embodiment.

Referring to FIG. 4, the piece of journal data may include 36 bits. The piece of journal data may include a first data item Data1 and a second data item Data2 that respectively refer to a bank address and a row address in the volatile memory device 300, and each of the first data item Data1 and the second data item Data2 may include 4 bits.

Referring to FIG. 4, since bits corresponding to the bank address in the piece of journal data are 0101, the bank address may be 5 (represented by 0101). In addition, because bits corresponding to the row address in the piece of journal data are 1011, the row address may be 11 (represented by 1011). In other words, the first data item Data1 may be 5, and the second data item Data2 may be 11. Therefore, the piece of journal data shown in FIG. 4 may be provided to an eleventh row of a fifth bank of the volatile memory device 300.

For ease of illustration, FIG. 4 illustrates that the piece of journal data includes 36 bits, and each of the first data item Data1 and the second data item Data2 includes 4 bits. In embodiments, however, the number of bits of each piece of journal data, the number of bits of each bank address, and the number of bits of each row address are not limited to those shown in FIG. 4 and may vary according to the characteristics of the storage device 1000 and the volatile memory device 300. For example, the number of bits of the first data item Data1 and the number of bits of the second data item Data2 may be different from each other.

Bits of the piece of journal data other than the bits for the bank address and the row address may, as described above, indicate at least one piece of information selected from among a PPN, a logical page number, valid page information, and reliability information.

Figure 5:
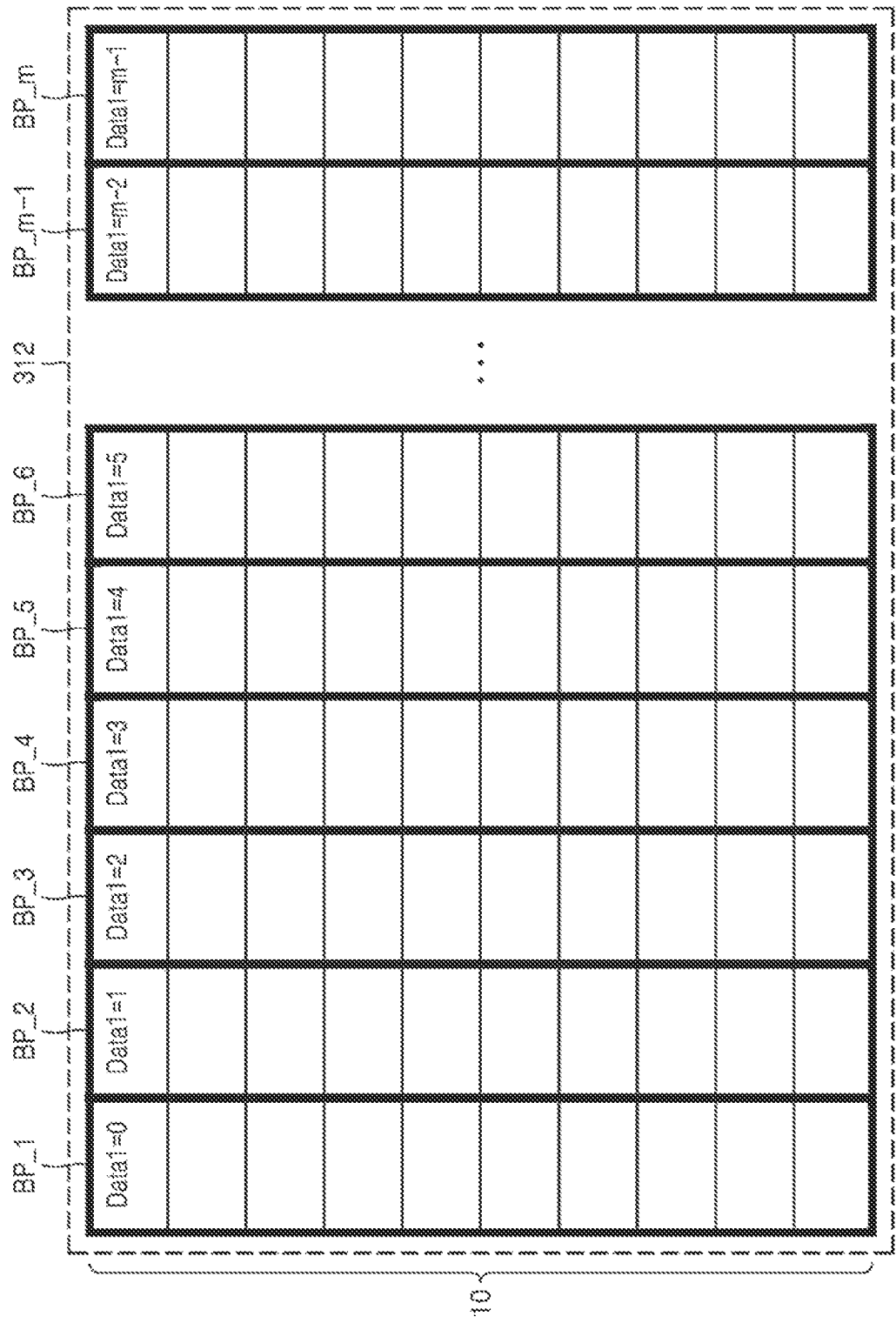
FIG. 5 is a diagram illustrating a layout of a plurality of bank pools according to an embodiment.

FIG. 5 is a diagram illustrating a layout of a plurality of bank pools according to an embodiment.

Referring to FIG. 5, a bank pool group 312 may include m bank pools BP_1 to BP_m. Referring to FIG. 5, each of the bank pools BP may temporarily store 10 pieces of journal data. For example, up to 10 pieces of journal data may be temporarily stored in a first bank pool BP_1. Therefore, a maximum of 10*m pieces of journal data may be temporarily stored in the bank pool group 312 shown in FIG. 5.

When journal data is temporarily stored in a bank pool BP up to the maximum storage capacity, the bank pool BP may be referred to as being saturated. For example, when 10 pieces of journal data are temporarily stored in the first bank pool BP_1, the first bank pool BP_1 may be referred to as being saturated.

For ease of illustration, FIG. 5 illustrates that each of the bank pools BP is capable of temporarily storing a maximum of 10 pieces of journal data. However, embodiments are not limited thereto. For example, the bank pools BP may temporarily store up to different amounts of journal data.

FIG. 6 is a diagram illustrating journal data stored in bank pools according to an embodiment.

As described above, each piece of journal data may include a first data item Data1 indicating a bank address in the volatile memory device 300 and a second data item Data2 indicating a row address in the volatile memory device 300.

Referring to FIG. 6, pieces of journal data of which the first data items Data1 are 0 may be temporarily stored in a first bank pool BP_1, and pieces of journal data of which the first data items Data1 are 1 may be temporarily stored in a second bank pool BP_2. That is, the journal data may be temporarily stored in the bank pools BP according to the first data items Data1 of the journal data. The memory controller 100 may temporarily store the journal data in the bank pools BP based on the first data items Data1 of the journal data. Therefore, the first data items Data1 of journal data that are temporarily stored in the same bank pool BP may be the same. For example, the first data items Data1 of the journal data temporarily stored in the first bank pool BP_1 of FIG. 6 may all be 0.

For ease of understanding, FIG. 6 illustrates that pieces of journal data that are temporarily stored in the first bank pool BP_1 are depicted with different shading/pattern according to the second data items Data2 of the pieces of journal data. Pieces of journal data having the same second data item Data2 are depicted as having the same shading/pattern.

FIG. 7 is a diagram illustrating journal data stored in bank pools BP according to an embodiment.

FIG. 7 may be described with reference to FIG. 6, and descriptions given with reference to FIG. 6 may not be repeatedly given.

Referring to FIG. 7, pieces of journal data of which the first data items Data1 are 0 may be temporarily stored in a first bank pool BP_1 as described above with reference to FIG. 6.

Referring to FIG. 7, pieces of journal data having the same first data item Data1 and temporarily stored in the first bank pool BP_1 as described with reference to FIG. 6 may be rearranged based on the second data items Data2 each indicating a row address. The term "rearrangement" may refer to a process in which pieces of journal data temporarily stored in a bank pool BP in an initial temporary order are rearranged (and temporarily stored) in a new order based on the second data items Data2 of the pieces of journal data. For example, the memory controller 100 may rearrange pieces of journal data temporarily stored in the first bank pool BP_1 in ascending or descending order based on the second data items Data2 of the pieces of journal data. When there are two or more pieces of journal data having the same first data item Data1 and the same second data item Data2, the two or more pieces of journal data may be rearranged adjacent to each other. For example, referring to FIG. 7, pieces of journal data of which the first data items Data1 are 0 and the second data items Data2 are 1 may be rearranged adjacent to each other in second and third lines Line_2 and Line_3 of the first bank pool BP_1.

When pieces of journal data having the same second data item Data2 are provided to the volatile memory device 300, the memory controller 100 may increase row buffer hit by enabling a row of the volatile memory device 300 corresponding to the same second data item Data2 and writing the pieces of journal data in the row of the volatile memory device 300.

In FIG. 6, when the pieces of journal data temporarily stored in the first bank pool BP_1 and not rearranged according to the second data items Data2 of the pieces of journal data are sequentially provided to the volatile memory device 300, because the first data item Data1 and the second data item Data2 of the piece of journal data temporarily stored in the first line Line_1 are respectively 0 and 4, a row having a row address of 4 in a bank having a bank address of 0 may be enabled, and then the piece of journal data temporarily stored in the first line Line_1 may be written into the volatile memory device 300. Thereafter, because the first data item Data1 and the second data item Data2 of the piece of journal data temporarily stored in the second line Line_2 are respectively 0 and 3, the row having a row address of 4 in the bank having a bank address of 0 may be disabled, and then a row having a row address of 3 in the bank having a bank address of 0 may be enabled to write the piece of journal data temporarily stored in the second line Line_2 to the volatile memory device 300. Thereafter, because the first data item Data1 and the second data item Data2 of the piece of journal data temporarily stored in the third line Line_3 are respectively 0 and 1, the row having a row address of 3 in the bank having a bank address of 0 may be disabled, and then a row having a row address of 1 in the bank having a bank address of 0 may be enabled to write the piece of journal data temporarily stored in the third line Line_3 to the volatile memory device 300.

However, as shown in FIG. 7, when the pieces of journal data rearranged according to the second data items Data2 of the pieces of journal data and temporarily stored in the first bank pool BP_1 are sequentially provided to the volatile memory device 300, because the first data item Data1 and the second data item Data2 of the piece of journal data temporarily stored in the first line Line_1 are respectively 0 and 1, the row having a row address of 1 in the bank having a bank address of 0 may be enabled, and then the piece of journal data temporarily stored in the first line Line_1 may be written into the volatile memory device 300. Thereafter, because the first data item Data1 and the second data item Data2 of the piece of journal data temporarily stored in the second line Line_2 are respectively 0 and 1, and the row having a row address of 1 in the bank having a bank address of 0 is already enabled, the pieces of journal data temporarily stored in the second line Line_2 may be written into the volatile memory device 300 without any additional enabling or disabling action. Thereafter, because the first data item Data1 and the second data item Data2 of the piece of journal data temporarily stored in the third line Line_3 are respectively 0 and 1, and the row having a row address of 1 in the bank having a bank address of 0 is already enabled, the piece of journal data temporarily stored in the third line Line_3 may be written into the volatile memory device 300 without any additional enabling or disabling action. Therefore, when pieces of journal data having the same second data item Data2 are managed (rearranged) adjacent to each other as in the first bank pool BP_1 shown in FIG. 7, row buffer hit may be improved compared to the case shown in FIG. 6.

The open time of the storage device 1000 may be reduced by improving row buffer hit and thus decreasing the time required to store journal data in the volatile memory device 300.

In general, journal data may be randomly stored in the journal buffer 310 according to the generation order and/or the type of journal data in an order unrelated to the first data items Data1 and second data items Data2 of the journal data as shown in FIG. 6. However, when the order of pieces of journal data are managed according to an embodiment, row buffer hit and bank parallelism (described later with reference to FIG. 10B) may be improved, and thus, the open time of the storage device 1000 may be reduced.

In another embodiment, when an overhead necessary for comparing second data items Data2 of journal data having the same first data item Data1 is greater than or equal to a preset overhead, the memory controller 100 may adjacently rearrange pieces of journal data having the largest number of second data items Data2 having the same value. For example, among ten pieces of journal data having the same first data item Data1 and temporarily stored in the first bank pool BP_1, when there are seven pieces of journal data of which the second data items Data2 are 0, two pieces of journal data of which the second data items Data2 are 1, and one piece of journal data of which the second data item Data2 is 2, adjacently arranging only the seven pieces of journal data of which the second data items Data2 are 0 may be a more efficient journal data management method in terms of an overhead necessary for comparing second data items Data2 than arranging all the ten pieces of journal data by comparing the second data items Data2 of the ten pieces of journal data. The overhead may refer to a time period and/or a memory space required for comparing second data items Data2, but is not limited thereto. The preset overhead may be dependent on the characteristics of the volatile memory device 300 and/or the journal buffer 310, but is not limited thereto.

FIG. 8 is a diagram illustrating journal data stored in bank pools according to an embodiment.

FIG. 8 may be described with reference to FIGS. 6 and 7, and descriptions given with reference to FIGS. 6 and 7 may be omitted.

FIG. 8 illustrates that journal data is temporarily stored in each of five bank pools BP (first to fifth bank pools BP_1 to BP_5) as described with reference to FIGS. 6 and 7. The number of bank pools BPs shown in FIG. 8 is just for ease of illustration, and embodiments are not limited thereto.

Referring to FIG. 8, the first to fifth bank pools BP_1 to BP_5 are arranged in ascending order based on first data items Data1, and pieces of journal data temporarily stored in the same bank pool BP are rearranged in ascending order based on second data items Data2.

Referring to FIG. 8, a piece of journal data (Data1=0, Data2=5) is to be temporarily stored in the first bank pool BP_1 as described above because the first data item Data 1 of the piece of journal data is 0. However, the first bank pool BP_1 is saturated, and thus, the piece of journal data having Data1=0 and Data2=5 may be temporarily stored in any one of the second to fifth bank pools BP_2 to BP_5 other than the first bank pool BP_1. According to an embodiment, the piece of journal data (Data1=0, Data2=5) may be temporarily stored in the third bank pool BP_3 that is not adjacent to the first bank pool BP_1. In FIG. 8, the fourth bank pool BP_4 is saturated, and thus, the piece of journal data (Data1=0, Data2=5) may not be temporarily stored in the fourth bank pool BP_4. In addition, because the second bank pool BP_2 and the fifth bank pool BP_5 are adjacent to the first bank pool BP_1, the piece of journal data (Data1=0, Data2=5) may not be temporarily stored in the second bank pool BP_2 and the fifth bank pool BP_5, and thus, the piece of journal data (Data1=0, Data2=5) may be temporarily stored in the third bank pool BP_3 that is not adjacent to the first bank pool BP_1. In an embodiment, the first bank pool PB_1 and the fifth bank pool PB_5 may be defined as being adjacent to each other. As described with reference to FIG. 9, the memory controller 100 may provide journal data temporarily stored in the fifth bank pool BP_5 to the journal data region 311, and may then provide journal data temporarily stored in the first bank pool BP_1 to the journal data region 311. That is, in providing journal data to the journal data region 311, the journal data temporarily stored in the fifth bank pool BP_5 may be provided to the journal data region 311, and then the journal data temporarily stored in the first bank pool PB_1 may be provided to the journal data region 311. Thus, the first bank pool BP_1 and the fifth bank pool BP_5 may be defined as being adjacent to each other.

Figure 9:
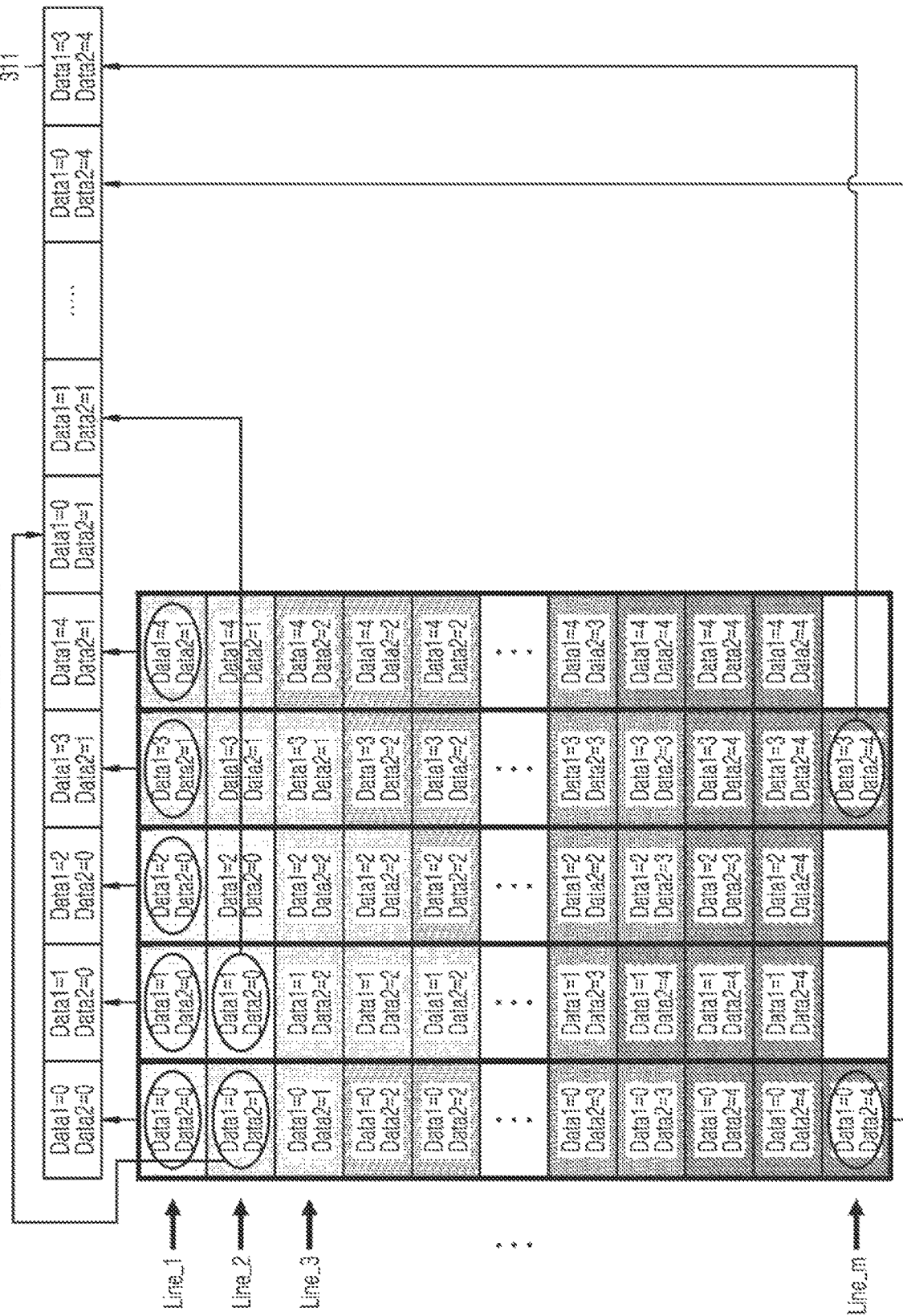
FIG. 9 is a diagram illustrating journal data stored in a journal data region according to an embodiment.

FIG. 9 is a diagram illustrating journal data stored in a journal data region according to an embodiment.

FIG. 9 may be described with reference to FIGS. 6, 7, and 8, and descriptions given with reference to FIGS. 6, 7, and 8 may be omitted.

FIG. 9 illustrates providing journal data temporarily stored in the first to fifth bank pools BP_1 to BP_5 shown in FIG. 8 to the journal data region 311 according to an embodiment.

Referring to FIG. 9, pieces of journal data having the same first data item Data1 may be temporarily stored in the same bank pool BP, and may be rearranged based on the second data items Data2 of the pieces of journal data such that pieces of journal data having the same second data item Data2 may be adjacent to each other. For example, pieces of journal data of which the first data items Data1 are 0 may be temporarily stored in the first bank pool BP_1, and the pieces of journal data temporarily stored in the first bank pool BP_1 may be rearranged in ascending order based on the second data items Data2 of the pieces of journal data. Therefore, pieces of journal data having the same second data item Data2 may be arranged adjacent to each other.

Referring to FIG. 9, a piece of journal data temporarily stored in a first line Line_1 of the first bank pool BP_1 may be provided to the journal data region 311. Then, a piece of journal data temporarily stored in a first line Line_1 of the second bank pool BP_2 adjacent to the first bank pool BP_1 may be provided to the journal data region 311. Then, a piece of journal data temporarily stored in a first line Line_1 of the third bank pool BP_3 adjacent to the second bank pool BP_2 may be provided to the journal data region 311. Then, a piece of journal data temporarily stored in a first line Line_1 of the fourth bank pool BP_4 adjacent to the third bank pool BP_3 may be provided to the journal data region 311. Thereafter, a piece of journal data temporarily stored in a first line Line_1 of the fifth bank pool BP_5 adjacent to the fourth bank pool BP_4 may be provided to the journal data region 311. That is, the pieces of journal data temporarily stored in a first line Line_1 of the bank pool group 312 may be sequentially provided to the journal data region 311 from the first bank pool BP_1 to the fifth bank pool BP_5, and may be sequentially stored in the journal data region 311 in the order in which the pieces of journal data are provided to the journal data region 311. After all the pieces of journal data temporarily stored in the first line Line_1 are provided to the journal data region 311, pieces of journal data temporarily stored in a second line Line_2 of the bank pool group 312 may be provided to the journal data region 311. That is, after the piece of journal data (Data1=4, Data2=1) temporarily stored in the first line Line_1 of the fifth bank pool BP_5 is provided to the journal data region 311, a piece of journal data (Data1=0, Data2=1) temporarily stored in a second line Line_2 of the first bank pool BP_1 may be provided to the journal data region 311. Pieces of journal data temporarily stored in the second line Line_2 of the bank pool group 312 may be sequentially provided to the journal data region 311 from the first bank pool BP_1 to the fifth bank pool BP_5. All pieces of temporarily stored journal data may be provided to the journal data region 311 by repeating the method described above.

The pieces of journal data may be stored in the journal data region 311 in the order in which the pieces of journal data are provided to the journal data region 311. For ease of description, it has been described with reference to FIG. 9 that pieces of journal data are sequentially provided to the journal data region 311 in the order of the first bank pool BP_1 to the fifth bank pool BP_5. However, embodiments are not limited to the order described above (the order of the first to fifth bank pools BP). The order in which pieces of journal data temporarily stored in the first line Line_1 of the bank pool group 312 are provided to the journal data region 311 may be applied when pieces of journal data temporarily stored in the other lines of the bank pool group 312 are provided to the journal data region 311. For example, when pieces of journal data temporarily stored on the first line Line_1 of the bank pool group 312 are provided to the journal data region 311 in the order of the first, third, fifth, second, and fourth bank pools BP (1st-3rd-5th-2nd-4th bank pool order), pieces of journal data temporarily stored in each of the second to mth lines Line_2 to Line_m of the bank pool group 312 may also be provided to the journal data region 311 in the same order (1st-3rd-5th-2nd-4th bank pool order). Providing pieces of journal data temporarily stored in each of the bank pools BPs to the journal data region 311 by the method described above may be referred to as sequentially providing pieces of journal data.

The method of managing the order of pieces of journal data stored in the journal data region 311 may be implemented with hardware, software, or a combination thereof. For example, the order of pieces of journal data may be determined using at least one of a tree, a priority queue, and a linked list.

Pieces of journal data may be temporarily stored in at least one bank pool BP of the bank pool group 312 based on first data items Data1 and the second data items Data2 of the pieces of journal data, and the pieces of temporarily stored journal data may be sequentially provided to the journal data region 311. As a result, pieces of journal data may be distributed and arranged based on bank addresses of the pieces of journal data, and pieces of journal data having the same bank address may be arranged based on row addresses thereof such that pieces of journal data having the same row address may be arranged adjacent to each other.

Figure 10A:
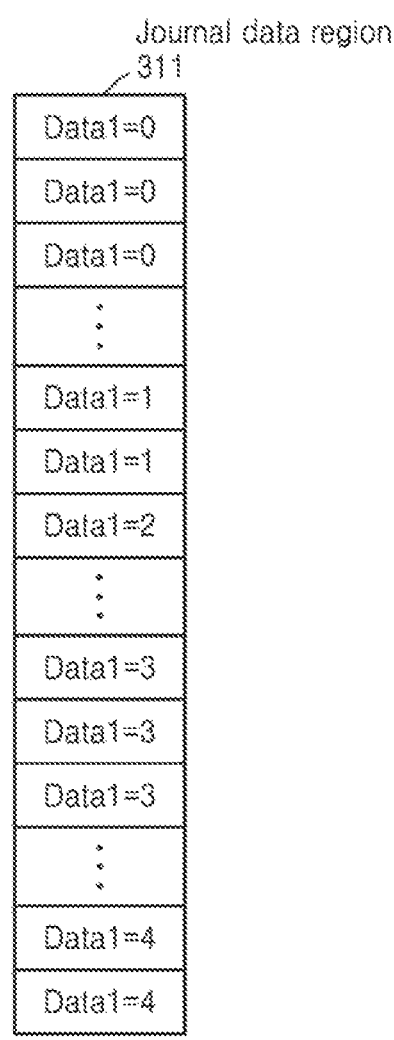
FIGS. 10A and 10B are diagrams illustrating journal data before and after a journal data management method is performed based on bank addresses according to an embodiment.
Figure 10B:
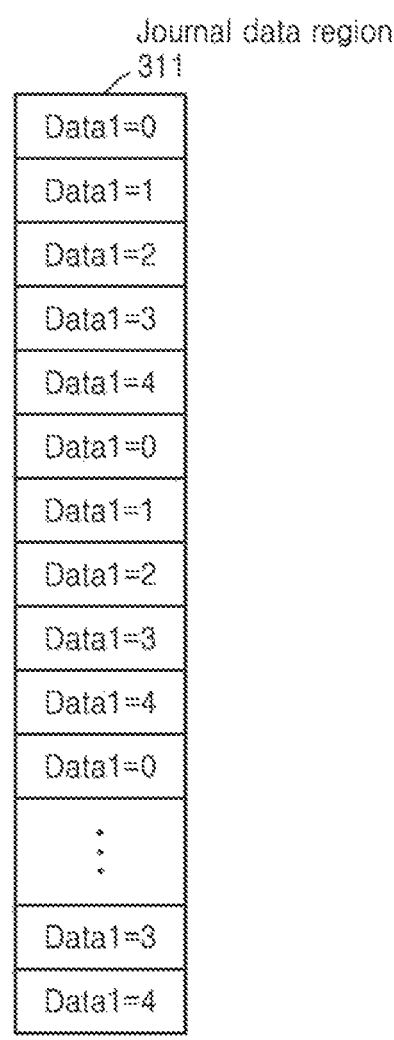

FIGS. 10A and 10B are diagrams illustrating journal data before and after a journal data management method is performed based on bank addresses according to an embodiment.

FIGS. 10A and 10B may be described with reference to FIG. 9, and descriptions given with reference to FIG. 9 may be omitted.

FIG. 10A shows that pieces of journal data temporarily stored in the bank pool group 312 may be arranged and stored in the journal data region 311 based on the first data items Data1 of the pieces of journal data such that pieces of journal data having the same first data item Data1 may be adjacent to each other in the journal data region 311.

FIG. 10B shows that pieces of journal data temporarily stored in the bank pool group 312 may be rearranged and stored in the journal data region 311 according to the embodiment described with reference to FIG. 9.

A plurality of banks (refer to the banks 320_1 to 320_m in FIG. 3) included in the volatile memory device 300 may be independently enabled. That is, because different banks are independently enabled, pieces of journal data may be written in parallel to the different banks. Therefore, when pieces of data are simultaneously written into a plurality of banks, bank parallelism may be high.

When pieces of journal data stored in the journal data region 311 shown in FIG. 10A are written to the volatile memory device 300 according to the order of rearrangement, pieces of journal data of which the first data items Data1 are 0 are all written to the first bank 320_1 by enabling the first bank 320_1, and thereafter, pieces of journal data of which the second data items Data2 are 1 may be written to the second bank 320_2 by enabling the second bank 320_2. That is, pieces of journal data may not be simultaneously written to the first bank 320_1 and the second bank 320_2.

However, when pieces of journal data stored in the journal data region 311 shown in FIG. 10B are interleaved in the order of rearrangement based on the first data items Data 1 of the pieces of journal data and are written to the volatile memory device 300, pieces of journal data (Data1=0) may be written to the first bank 320_1 by enabling the first bank 320_1, and pieces of journal data (Data1=1) may be written to the second bank 320_2 by enabling the second bank 320_2. That is, when pieces of journal data arranged according to an embodiment are written to the volatile memory device 300, the pieces of journal data may be written at a high write speed with an improved bandwidth.

The journal data management method of the embodiments may reduce the open time of the storage device 1000 by improving row buffer hit and bank parallelism.

Figure 11:
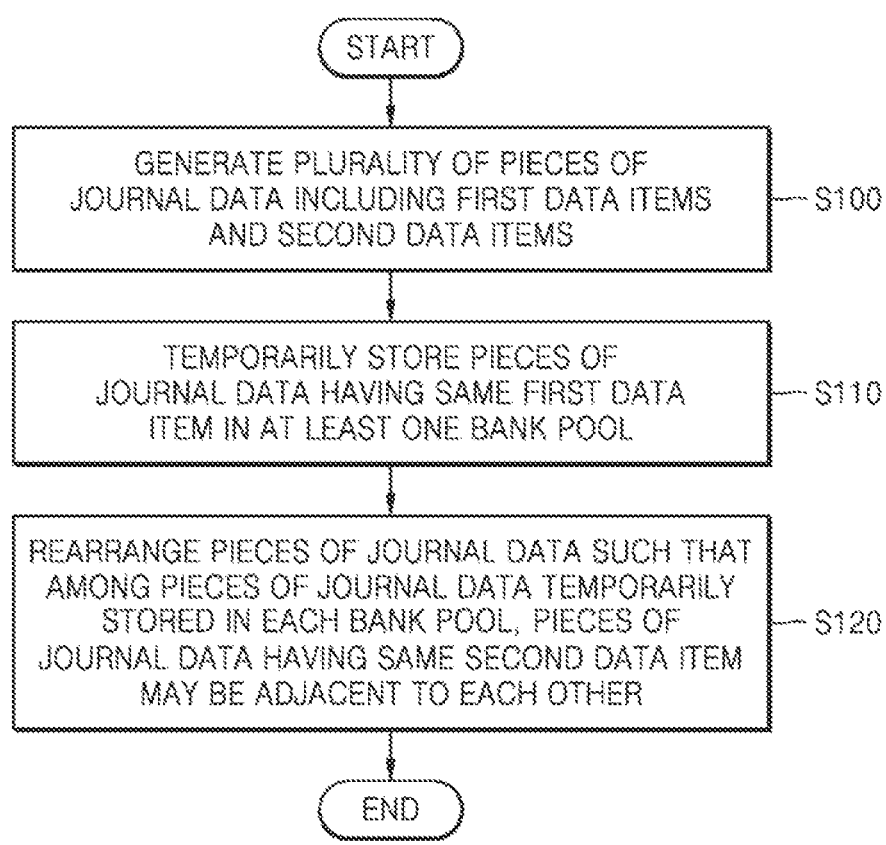
FIG. 11 is a flowchart illustrating an operating method of a memory controller according to an embodiment.

FIG. 11 is a flowchart illustrating an operating method of the memory controller 100 according to an embodiment.

Referring to FIG. 11, the memory controller 100 may generate a plurality of pieces of journal data including first data items Data1 and second data items Data2 in operation S100. Each of the pieces of journal data may include a first data item Data1 indicating a bank address in the volatile memory device 300 and a second data item Data2 indicating a row address in the volatile memory device 300.

The memory controller 100 may temporarily store pieces of journal data having the same first data item Data1 in at least one bank pool BP in operation S1101. For example, referring to FIG. 6, the memory controller 100 may temporarily store, in the first bank pool BP_1, pieces of journal data of which the first data items Data1 are 0.

The memory controller 100 may rearrange the order of the pieces of journal data in operation S1201, such that among pieces of journal data temporarily stored in each bank pool BP, pieces of journal data having the same second data item Data2 may be adjacent to each other. Referring to FIG. 7, pieces of journal data having the same first data item Data1 and temporarily stored in the first bank pool BP_1 may be rearranged in the ascending order of the second data items Data2 of the pieces of journal data such that pieces of journal data having the same second data item Data2 may be adjacent to each other.

Figure 12:
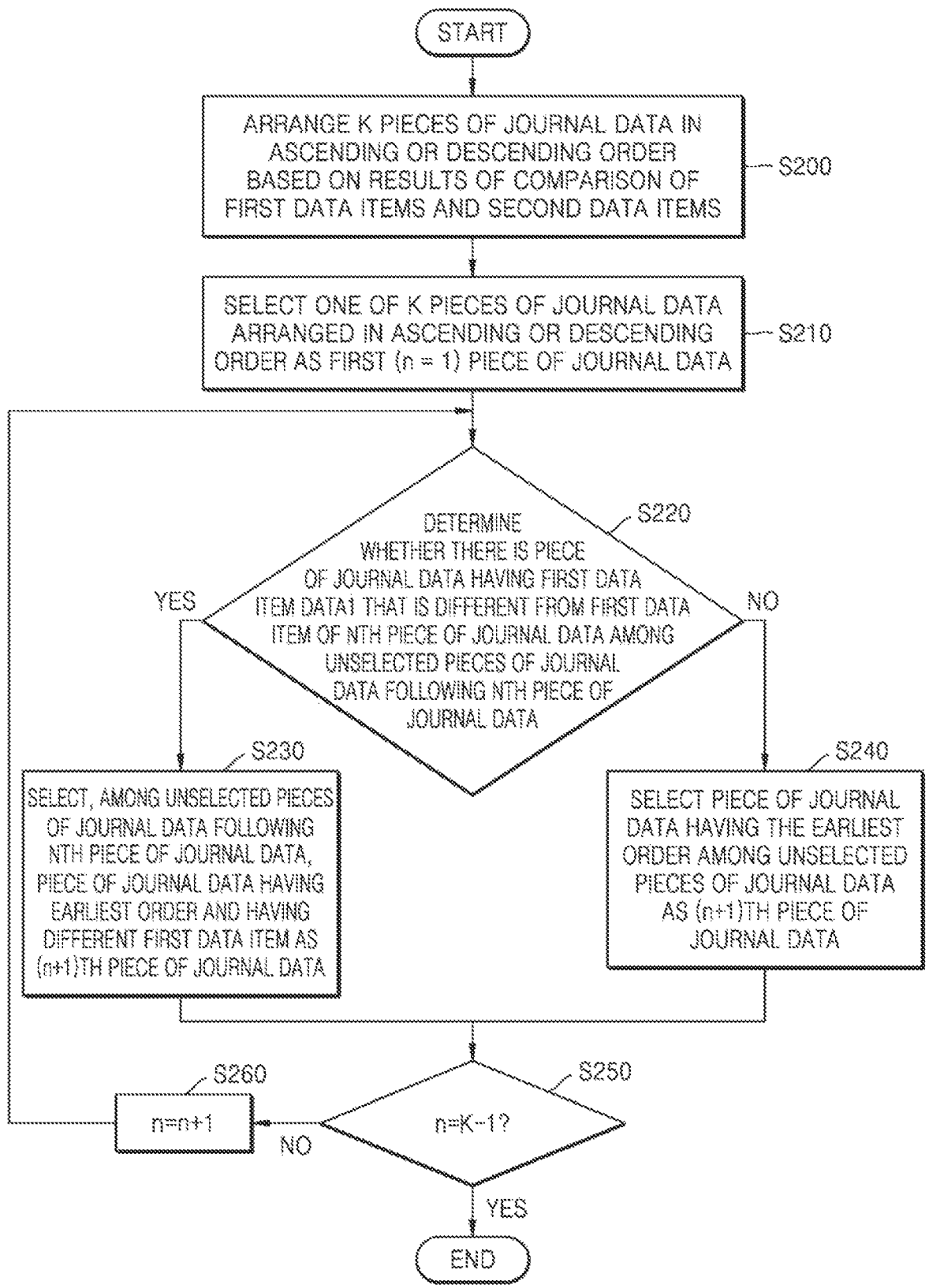
FIG. 12 is a flowchart illustrating a journal data management method according to an embodiment.

FIG. 12 is a flowchart illustrating a journal data management method of the memory controller 100 according to an embodiment.

Referring to FIG. 12, the memory controller 100 may arrange K pieces of journal data in ascending or descending order based on results of comparison of first data items Data1 and second data items Data2 in operation S200. For example, first data items Data1 of the K pieces of journal data are compared with each other, and second data items Data2 of pieces of journal data having the same first data item Data1 among the K pieces of journal data are compared with each other to arrange the K pieces of journal data in ascending or descending order according to the first data items Data1 and the second data items Data2. Pieces of journal data having the same first data item Data1 and the same second data item Data2 may be arranged adjacent to each other in a state in which an early-generated piece of journal data is located ahead of a later-generated piece of journal data.

The K pieces of journal data arranged in ascending or descending order may be rearranged in order by a method described below. Pieces of journal data rearranged in order by the method described below may be referred to as selected pieces of journal data, and pieces of journal data not rearranged in order may be referred to as unselected pieces of journal data.

The memory controller 100 may select one of the K pieces of journal data arranged in ascending or descending order as a first (n=1) piece of journal data in operation S210. For example, among the K pieces of journal data arranged in ascending or descending order in operation S200, a piece of journal data having the earliest order may be selected as the first (n=1) piece of journal data. However, embodiments are not limited thereto, and one may be randomly selected from the K pieces of journal data as the first (n=1) piece of journal data.

In operation S220, the memory controller 100 may determine whether there is a piece of journal data having a first data item Data1 that is different from the first data item Data1 of an nth piece of journal data among unselected pieces of journal data following the nth piece of journal data.

When it is determined that there is a piece of journal data having a first data item Data 1 that is different from the first data item Data1 of the nth piece of journal data among the unselected pieces of journal data following the nth piece of journal data (YES in operation S220), the memory controller 100 may select, among the unselected pieces of journal data following the nth piece of journal data, a piece of journal data having the earliest order and having a first data item Data1 that is different from the first data item Data1 of the nth piece of journal data as an (n+1)th piece of journal data in operation S230.

When it is determined that there is no piece of journal data having a first data item Data 1 that is different from the first data item Data1 of the nth piece of journal data among the unselected pieces of journal data following the nth piece of journal data (NO in operation S220), the memory controller 100 may select a piece of journal data having the earliest order among unselected pieces of journal data as an (n+1)th piece of journal data in operation S240.

The memory controller 100 may determine whether all the K pieces of journal data are selected pieces of journal data in operation S250.

When it is determined that not all the K pieces of journal data are selected pieces of journal data (NO in operation S250), the memory controller 100 may select an (n+2) piece of journal data by the method described above based on the selected (n+1)th piece of journal data in operation S260. When it is determined that all the K pieces of journal data are selected pieces of journal data (YES in operation S250), the method may end.

As described above, first data items Data1 may refer to bank addresses in the volatile memory device 300, and second data items Data2 may refer to row addresses in the volatile memory device 300. Operations S210 and S220 described with reference to FIG. 12 may be repeated from n=1 to n=K-1. That is, the order of all the K pieces of journal data may be rearranged by the method described above. K may be an integer greater than or equal to 3. The journal data management method described above is further described with reference to FIGS. 13A and 13B.

Figure 13A:
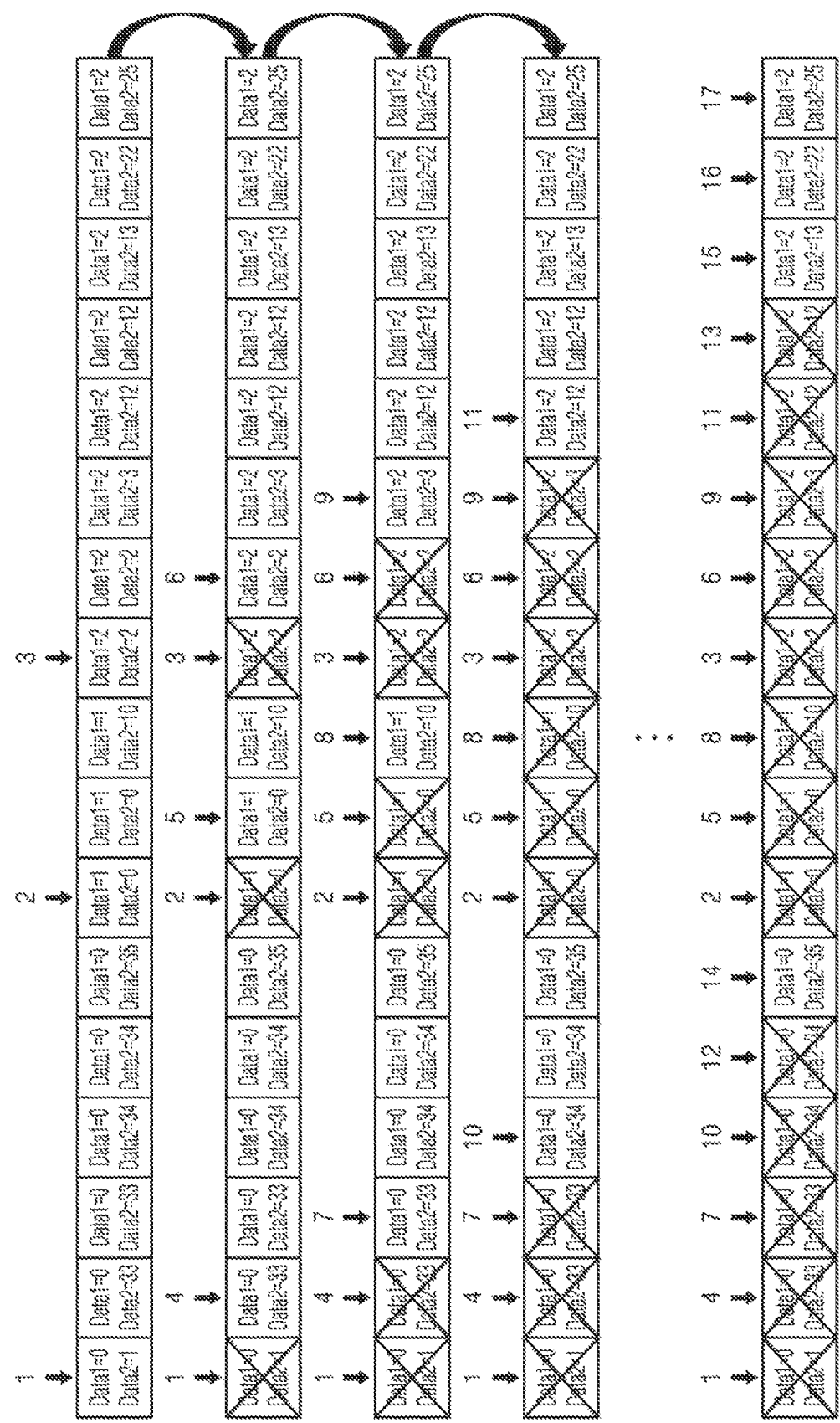
Figure 13B:
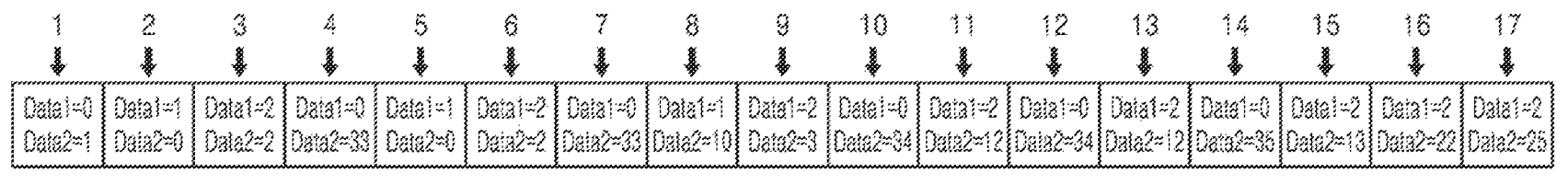

FIGS. 13A and 13B are diagrams illustrating journal data before and after the journal data is managed according to the flowchart of the journal data management method shown in FIG. 12, according to an embodiment.

Reference is made to FIG. 12 in the description of FIGS. 13A and 13B. Referring to FIG. 13A and operation S200 described with reference to FIG. 12, the memory controller 100 may arrange K pieces (K=17) of journal data in ascending order based on results of comparison of first data items Data1 and second data items Data2.

Referring to FIG. 13A and operation S210 described with reference to FIG. 12, the memory controller 100 may select a piece of journal data (Data1=0, Data2=1) having the earliest order among the 17 pieces of journal data arranged in ascending order as a first piece of journal data.

Referring to FIG. 13A and operation S220 described with reference to FIG. 12, the memory controller 100 may determine whether there is a piece of journal data having a first data item Data1 that is different from the first data item Data1 of the first (n=1) piece of journal data (Data1=0, Data2=1) among unselected pieces of journal data following the first piece of journal data. For example, because there are 11 pieces of journal data having different first data items Data1 among the unselected pieces of journal data following the first piece of journal data (Data1=0, Data2=1), the memory controller 100 may determine that there are pieces of journal data having first data items Data1 that are different from the first data item Data1 of the first piece of journal data (Data1=0, Data2=1) among the unselected pieces of journal data following the first piece of journal data (Data1=0, Data2=1).

Referring to FIG. 13A and operation S230 described with reference to FIG. 12, the memory controller 100 may select a piece of journal data (Data1=1, Data2=0) having the earliest order as a second (n=2) piece of journal data among the unselected pieces of journal data following the first piece of journal data (Data1=0, Data2=1).

Referring to FIG. 13A and operation S250 described with reference to FIG. 12, the memory controller 100 may determine whether to terminate the journal data management method or perform operation S220 described with reference to FIG. 12 by determining whether all the 17 pieces of journal data are selected pieces of journal data. For example, because there are 15 unselected pieces of journal data, the memory controller 100 may determine whether there is a piece of journal data having a first data item Data1 that is different from the first data item Data1 of the second piece of journal data (Data1=1, Data2=0) among the unselected pieces of journal data following the second piece of journal data (Data1=1, Data2=0) (refer to operation S220 described with reference to FIG. 12).

Referring to FIG. 13A and operation S220 described with reference to FIG. 12, the memory controller 100 may determine whether there is a piece of journal data having a first data item Data1 that is different from the first data item Data1 of the second piece of journal data (Data1=1, Data2=0) among the unselected pieces of journal data following the second piece of journal data (Data1=1, Data2=0). For example, because there are 8 pieces of journal data having a first data item Data 1 that is different from the first data item Data1 of the second piece of journal data (Data1=1, Data2=0) among the unselected pieces of journal data following the second piece of journal data (Data1=1, Data2=0), the memory controller 100 may determine that there are pieces of journal data having a first data item Data1 that is different from the first data item Data1 of the second piece of journal data (Data 1=1, Data2=0) among the unselected pieces of journal data following the second piece of journal data (Data1=1, Data2=0).

Referring to FIG. 13A and operation S230 described with reference to FIG. 12, the memory controller 100 may select a piece of journal data (Data2=2, Data2=2) having the earliest order as a third (n=3) piece of journal data among the unselected pieces of journal data following the second piece of journal data (Data1=1, Data2=0).

Referring to FIG. 13A and operation S250 described with reference to FIG. 12, as described above, the memory controller 100 may determine whether to terminate the journal data management method or perform operation S220 described with reference to FIG. 12 by determining whether all the 17 pieces of journal data are selected pieces of journal data. For example, because there are 14 unselected pieces of journal data, the memory controller 100 may determine whether there is a piece of journal data having a first data item Data1 that is different from the first data item Data1 of the third piece of journal data (Data1=2, Data2=2) among the unselected pieces of journal data following the third piece of journal data (Data2=1, Data2=2) (refer to operation S220 described with reference to FIG. 12).

Referring to FIG. 13A and operation S220 described with reference to FIG. 12, the memory controller 100 may determine whether there is a piece of journal data having a first data item Data1 that is different from the first data item Data1 of the third piece of journal data (Data1=2, Data2=2) among the unselected pieces of journal data following the third piece of journal data (Data1=2, Data2=2). For example, because there is no piece of journal data having a first data item Data1 that is different from the first data item Data1 of the third piece of journal data (Data1=2, Data2=2) among the unselected pieces of journal data following the third journal data (Data1=2, Data2=2), the memory controller 100 may determine that there is no piece of journal data having a first data item Data1 that is different from the first data item Data1 of the third piece of journal data (Data1=2, Data2=2) among the unselected pieces of journal data following the third piece of journal data (Data1=2, Data2=2).

Referring to FIG. 13A and operation S240 described with reference to FIG. 12, the memory controller 100 may select a piece of journal data (Data1=0, Data2=33) having the earliest order among the unselected journal data as a fourth (n=4) piece of journal data.

The memory controller 100 may rearrange the order of the K pieces of journal data by the journal data management method described with reference to FIGS. 12 and 13A. Referring to FIG. 13A, for ease of illustration, pieces of journal data selected in each operation are marked with X.

As shown in FIG. 13A, the memory controller 100 may select a thirteenth (n=13) piece of journal data (Data1=2, Data2=12) by repeating the journal data management method. According to the journal data management method described above, because there is no piece of journal data having a first data item Data1 that is different from the first data item Data1 of the thirteenth piece of journal data (Data1=2, Data2=12) among the unselected journal data following the thirteenth pieces of journal data (Data1=2, Data2=12), the memory controller 100 may select a piece of journal data (Data1=0, Data2=35) having the earliest order among the unselected pieces of journal data as a fourteenth (n=14) piece of journal data. Because there are pieces (e.g., three pieces) of journal data having first data items Data1 that are different from the first data item Data1 of the fourteen pieces of journal data (Data1=0, Data2=35), the memory controller 100 may select a piece of journal data (Data1=2, Data2=13) having the earliest order among the pieces of journal data as a fifteenth (n=15) piece of journal data.

Because there is no piece of journal data having a different first data item Data1 among the unselected pieces of journal data following the fifteenth piece of journal data (Data1=2, Data2=13), the memory controller 100 may select a piece of journal data (Data1=2, Data2=22) having the earliest order among the unselected pieces of journal data as a sixteenth (n=16) piece of journal data. Because there is no piece of journal data having a different first data item Data1 among the unselected pieces of journal data following the sixteenth piece of journal data (Data1=2, Data2=22), the memory controller 100 may select a piece of journal data (Data1=2, Data2=25) having the earliest order among the unselected pieces of journal data as a seventeenth (n=17) piece of journal data.

According to an embodiment, when there is no piece of journal data having a different first data item Data1 among unselected pieces of journal data following an nth piece of journal data and there is no unselected piece of journal data in front of the nth piece of journal data, the unselected pieces of journal data following the nth piece of journal data may be selected in a sorted order (in ascending or descending order). For example, referring to FIG. 13A, there is no piece of journal data having a different first data item Data1 among the unselected pieces of journal data following the fifteenth (n=15) piece of journal data (Data1=2, Data2=13), and there is no unselected piece of journal data in front of the fifteenth piece of journal data. Thus, the memory controller 100 may select the unselected pieces of journal data following the fifteenth piece of journal data in a sorted order as a sixteenth piece of journal data (Data1=2, Data2=22) and a seventeenth piece of journal data (Data1=2, Data2=25).

FIG. 13B illustrates the order of the K pieces of journal data rearranged by the journal data management method described with reference to FIG. 12. K in this example is depicted as being 17, but alternative numbers of pieces may be implemented. Referring to the order of the K pieces of journal data shown in FIG. 13B, pieces of journal data having the same first data item Data1 referring to a bank address in the volatile memory device 300 are distributed, and among the pieces of journal data having the same first data item Data1, pieces of journal data having the same second data item Data2 referring to a row address in the volatile memory device 300 are managed (rearranged) in order to be adjacent to each other. Therefore, according to the journal data management method described above, bank parallelism and row buffer hit may be improved.

Each of the embodiments provided in the above description is not excluded from being associated with one or more features of another example or another embodiment also provided herein or not provided herein but consistent with the disclosure While the disclosure has been particularly shown and described with reference to embodiments thereof, it will be understood that various changes in form and details may be made therein without departing from the spirit and scope of the following claims.

What is claimed is:

1. A storage device comprising:
    a journal buffer configured to store a plurality of pieces of journal data, the journal buffer comprising a plurality of bank pools and a journal data region, wherein each of the plurality of pieces of journal data comprises a first data item corresponding to a bank address and a second data item corresponding to a row address; and
    a memory controller configured to control the journal buffer to:
        temporarily store first pieces of journal data from among the plurality of pieces of journal data of which the first data items are equal to each other in at least one of the plurality of bank pools, and
        rearrange the first pieces of journal data based on results of a comparison between the second data items corresponding to the first pieces of journal data.

2. The storage device of claim 1, wherein the memory controller is further configured to control the journal buffer to:
    sequentially provide the first pieces of journal data to the journal data region, and
    store, in the journal data region, the first pieces of journal data based on an order in which the first pieces of journal data are provided to the journal data region.

3. The storage device of claim 2, further comprising a non-volatile memory, wherein the memory controller is further configured to provide the first pieces of journal data to the non-volatile memory while maintaining the order in which the first pieces of journal data are stored in the journal data region.

4. The storage device of claim 1, wherein the memory controller is further configured to control the journal buffer to arrange the plurality of bank pools in ascending or descending order based on the first data items.

5. The storage device of claim 1, wherein the memory controller is further configured to control the journal buffer to rearrange the first pieces of journal data temporarily stored in the at least one of the plurality of bank pools in ascending or descending order based on corresponding second data items.

6. The storage device of claim 1, wherein the memory controller is further configured to control the journal buffer to rearrange second pieces of journal data among the first pieces of journal data of which the second data items are equal to each other based on a generation order of the second pieces of journal data.

7. The storage device of claim 1, wherein the memory controller is further configured to control the journal buffer to, based on an overhead for comparing the second data items being greater than or equal to a preset overhead, temporarily and adjacently store third pieces of journal data having a largest number of second data items equal to each other.

8. The storage device of claim 1, wherein the memory controller is further configured to control the journal buffer to, based on at least one bank pool of the plurality of bank pools being a saturated bank pool, temporarily store a fourth piece of journal data of which the first data item is equal to the first data items of first pieces of journal data in a bank pool of the plurality of bank pools that is not adjacent to the at least one saturated bank pool.

9. The storage device of claim 1, wherein each of the plurality of pieces of journal data further comprises at least one of a physical page number, a logical page number, and valid page information.

10. An operating method of a memory controller configured to control operations of a journal buffer comprising a plurality of bank pools and a journal data region, the operating method comprising:
    generating a plurality of pieces of journal data each comprising a first data item and a second data item;
    temporarily storing, in at least one of the plurality of bank pools, first pieces of journal data from among the plurality of pieces of journal data of which the first data items are equal to each other; and
    rearranging an order of the first pieces of journal data temporarily stored in the at least one of the plurality of bank pools such that pieces of journal data among the first pieces of journal data of which the second data items are equal to each other are adjacent to each other,
    wherein the first data items correspond to bank addresses in a volatile memory device, and
    wherein and the second data items correspond to row addresses in the volatile memory device.

11. The method of claim 10, further comprising:
    sequentially providing the first pieces of journal data of which the order is rearranged to the journal data region; and
    storing the sequentially provided first pieces of journal data in the journal data region.

12. The method of claim 11, further comprising providing the first pieces of journal data to a non-volatile memory while maintaining the order in which of the first pieces of journal data are stored in the journal data region.

13. The method of claim 11, wherein the sequentially providing of the first pieces of journal data comprises:
arranging the plurality of bank pools in ascending order or descending order based on the first data items of the first pieces of journal data; and
determining, based on the ascending order or the descending order, an order in which the plurality of bank pools provide the first pieces of journal data to the journal data region.

14. The method of claim 10, wherein the rearranging the order of the first pieces of journal data comprises rearranging the first pieces of journal data in ascending order or descending order based on the corresponding second data items.

15. The method of claim 14, wherein the rearranging the order of the first pieces of journal data comprises rearranging second pieces of journal data among the first pieces of journal data of which the second data items are equal to each other in an order in which the second pieces of journal data are generated.

16. A journal data management method of managing an order of K pieces of journal data, each K piece of journal data comprising a first data item and a second data item, the journal data management method comprising:
arranging the K pieces of journal data in ascending order or descending order based on a result of comparison of the first data items and the second data items of the K pieces of journal data;
determining a storage order of the K pieces of journal data for storage in a journal data region of a volatile memory, wherein determining the storage order comprises:
selecting one of the K pieces of journal data arranged in ascending order or descending order as an nth piece of journal data for storage in the storage order;
determining, among unelected pieces of journal data following the nth piece of journal data, whether first data items of the unselected pieces of journal data following the nth piece of journal data are equal to a first data item of the nth piece of journal data;
based on at least one of the first data items of the unselected pieces of journal data following the nth piece of journal data not being equal to the first data item of the nth piece of journal data, selecting, among the unselected pieces of journal data following the nth piece of journal data and as an (n+1)th piece of journal data for storage after the nth piece of journal data for storage in the storage order, a piece of journal data being earliest in the order of the unselected pieces of journal data following the nth piece of journal data and of which the first data item is different from the first data item of the nth piece of journal data; and
based on the first data items of the unselected pieces of journal data following the nth piece of journal data being equal to the first data item of the nth piece of journal data, selecting, as the (n+1)th piece of journal data for storage after the nth piece of journal data for storage in the storage order, a piece of journal data being earliest in the order of the unselected pieces of journal data following the nth piece of journal data, and
storing the K pieces of journal data in the journal data region of the volatile memory according to the determined storage order,
wherein K is an integer greater than or equal to 3,
wherein n is an integer greater than or equal to 1 and is less than K,
wherein the first data items correspond to bank addresses, and
wherein the second data items correspond to row addresses.

17. The journal data management method of claim 16, wherein the arranging of the K pieces of journal data comprises:
comparing the first data items of the K pieces of journal data with each other,
comparing the second data items of pieces of journal data of the K pieces of journal data of which the first data items are equal to each other, and
arranging the K pieces of journal data in ascending order or descending order based on the comparison of the second data items of the pieces of journal data of the K pieces of journal data of which the first data items are equal to each other.

18. The journal data management method of claim 17, wherein the arranging of the K pieces of journal data comprises:
arranging pieces of journal data of which the first data items are equal to each other and of which the second data items are equal to each other such that at least one earlier generated piece of journal data is positioned ahead of at least one later generated piece of journal data.

19. The journal data management method of claim 16, further comprising, based on no unselected piece of journal data being in front of the nth piece of journal data, selecting the unselected pieces of journal data following the nth piece of journal data in the arranged order as the storage order.

20. The journal data management method of claim 16, wherein selecting of one of the K pieces of journal data arranged in ascending or descending order as the nth piece of journal data comprises selecting, a piece of journal data being earliest in the order of the K pieces of journal data that are arranged in ascending or descending order as the nth piece of journal data for storage in the storage order, and wherein n equals 1.

* * * * *